United States Patent [19]
Brouard et al.

[11] 3,987,027
[45] Oct. 19, 1976

[54] PHENYL AZOPHENYL DYESTUFF

[75] Inventors: Claude Marie Henri Brouard, Sotteville Les Rouen; Bernard Dupont, Roussillon; Louis Jean-Pierre Leroy, Saint Etienne Du Rouvray; Jean-Pierre Henri Stiot, Saint Pierre Les Elbeuf, all of France

[73] Assignee: Produits Chimiques Ugine Kuhlmann, Paris, France

[22] Filed: Aug. 6, 1974

[21] Appl. No.: 495,718

[30] Foreign Application Priority Data
Aug. 8, 1973 France .................. 73.28972

[52] U.S. Cl. .................. 260/207; 260/207.1; 260/187; 260/158
[51] Int. Cl.² .................. C09B 29/24
[58] Field of Search .................. 260/207, 207.1, 187

[56] References Cited
UNITED STATES PATENTS
3,707,533    12/1972    Pohl .................. 260/207

FOREIGN PATENTS OR APPLICATIONS
46-5274    2/1971    Japan .................. 260/207
1,208,223    10/1970    United Kingdom
1,324,367    7/1973    United Kingdom

*Primary Examiner*—Allen B. Curtis
*Attorney, Agent, or Firm*—Beveridge, DeGrandi, Kline & Lunsford

[57] ABSTRACT

Dyestuff of the formula:

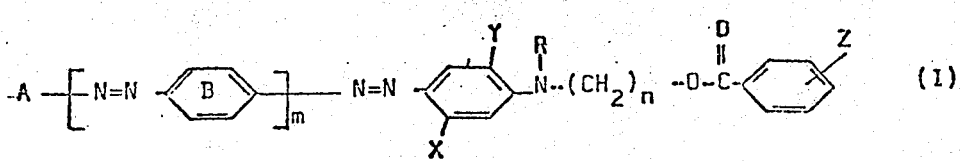

in which $m$ is equal to 0 or 1, $n$ is equal to 1, 2 or 3, A represents the residue of an aromatic or heterocyclic diazotizable amine devoid of solubilizing acid groups, the benzene ring B is unsubstituted or substituted by one or two atoms of chlorine or bromine or methyl, ethyl, methoxy, ethoxy or acylamino groups, X represents a hydrogen or chlorine atom or a methyl, ethyl, methoxy, ethoxy or acylamino group, Y represents a hydrogen atom or a methyl, ethyl, methoxy or ethoxy group, R represents a hydrogen atom, a mono substituted or unsubstituted alkyl group or a group of the formula:

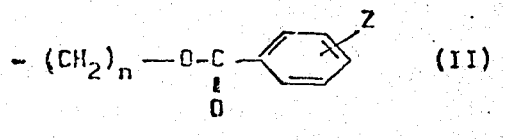

and Z represents a 2-cyanovinyl, 2-cyanoethyl or 2-chloro-2-cyanoethyl residue; process for the preparation of dyestuffs of the above formula; process for coloring hydrophobic materials with such dyestuffs; hydrophobic materials colored with such dyestuffs and esters of the formula:

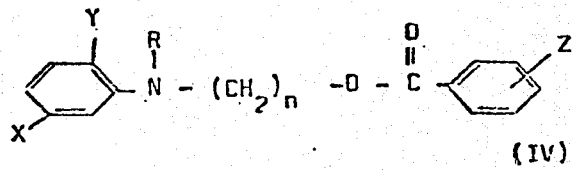

wherein $m$, $n$, A, B, R, X, Y and Z have the meanings given above.

12 Claims, No Drawings

PHENYL AZOPHENYL DYESTUFF

The present invention relates to new azo compounds which are scarcely soluble in water and can be used as dispersion dyestuffs for dyeing and printing fibers or fibrous materials which are based on organic substances with high molecular weight, are hydrophobic and are wholly or partially synthetic.

According to the present invention dyestuffs are provided of the general formula:

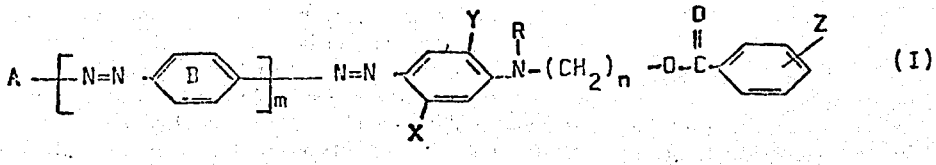

in which $m$ is equal to 0 or 1, $n$ is equal to 1, 2 or 3, preferably 2, A represents the residue of an aromatic or heterocyclic diazotisable amine devoid of any solubilising acid groups such as sulphonic or carboxylic groups, the benzene ring B is unsubstituted or substituted by one or two atoms of chlorine or bromine or methyl, ethyl, methoxy, ethoxy or acylamino groups, X represents a hydrogen or chlorine atom or a methyl, ethyl, methoxy, ethoxy or acylamino group, Y represents a hydrogen atom or a methyl, ethyl, methoxy or ethoxy group, R represents a hydrogen atom, a mono substituted or unsubstituted alkyl group, or a group of the formula:

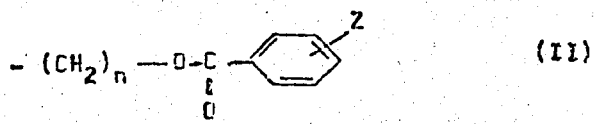

and Z represents a 2-cyano-vinyl residue, a 2-cyano-ethyl residue or a 2-chloro-2-cyano-ethyl residue fixed in the ortho, meta or para postion.

Examples of residue A are phenyl, naphthyl, thiazolyl, benzothiazolyl, benzisothiazolyl, thienyl, thiadiazolyl and imidazolyl. These residues may have from one to three substituents such as, for example, chlorine or bromine atoms or the nitro, cyano, thiocyano, acyl, carbalkoxy containing 2 to 5 carbon atoms or alkylsulphonyl groups containing 1 to 4 carbon atoms.

The alkyl group, which may be represented by R or which is part of the alkylsulphonyl groups possibly present on the A residue preferably contains 1 to 4 carbon atoms. The carbalkoxy group possibly present on the A residue preferably contains 2 to 5 carbon atoms.

The acyl residue of the acylamino groups which are possibly present on the B ring or may be represented by X, may be that of an aliphatic acid with a low molecular weight, such as for example formyl, acetyl or propanoyl, or that of an aromatic acid, for example benzoyl, or of an araliphatic acid, for example cinnamoyl.

The acetyl group may be mentioned more particularly as an acyl residue which is possibly present on the A residue.

The hydroxy, alkoxy containing one to four carbon atoms, phenoxy, acyloxy, especially acetyloxy, nitrile, alkylsulphonyl, containing 1 to 4 carbon atoms, carbalkoxy, containing 2 to 5 carbon atoms, alkoxycarbonyloxy groups containing 2 to 5 carbon atoms may be mentioned as possible substituents of the alkyl group which may be represented by R.

The dyestuffs of formula (I) may be prepared for example by coupling the diazo derivative of an amine of the formula:

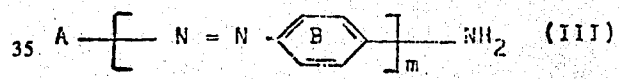

with an ester of the formula:

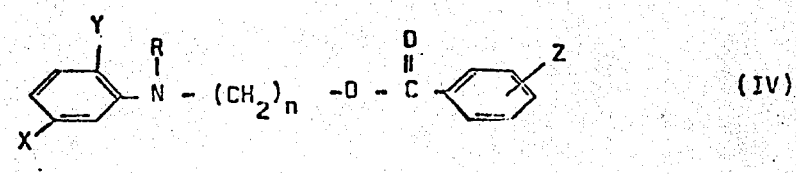

or with an alcohol of the formula:

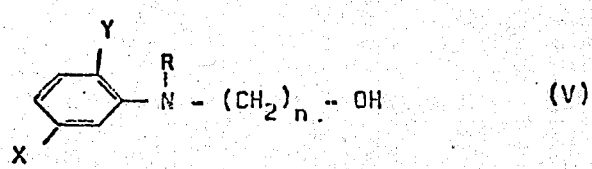

and, in this latter case, subsequently esterifying the dyestuff thus obtained of the formula:

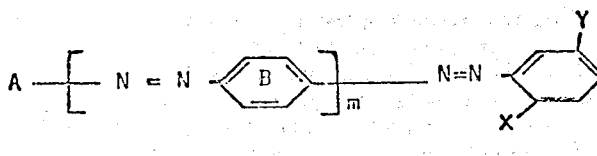
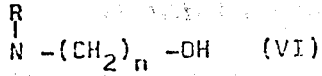

for example by means of an acid chloride of the formula:

In formulae (III) to (VII), m, n, A, B, R, X, Y and Z have the same meanings as given above.

The amine of formula (III) may be diazotised for example in a known manner by means of sodium nitrite in a hydrochloric or sulphuric medium or by means of nitrosyl sulphuric acid mixed with sulphuric acid or possibly a carboxylic acid such as acetic or propionic acid, at a temperature of approximately 0° C.

The coupling with the ester (IV) or with the alcohol (V) may also be effected for example in a known manner in a neutral or acid aqueous medium at a temperature of from 0° to 5° C.

The dyestuff of formula (VI) is preferably esterified by means of the acid chloride of formula (VII) in an inert organic solvent, in the presence of a proton acceptor such as for example pyridine, piperidine or a trialkyl amine such as triethyl amine. Examples of inert organic solvents are halogenated hydrocarbons such as methylene chloride, trichlorethylene or chlorobenzene, ketones such as acetone or methyl ethyl ketone and ethers such as diethyl ether, dioxan and methoxy benzene.

The esters of formula (IV) are new products and, as such, form part of the invention. They may be prepared for example, by esterifying the alcohol of formula (V) by means of an acid chloride of formula (VII) under the same conditions as those given above for the esterification of the dyestuffs of formula (VI).

The acid chlorides of formula (VII) may be prepared for example by reacting thionyl chloride with the corresponding acids of the formula:

wherein Z has the same meaning as that given above.

The acids of formula (VIII), in which Z represents the 2-chloro 2-cyano ethyl residue (-CH₂-CHCl-CN), may be prepared, for example, by the Meerwein reaction between acrylonitrile and the diazonium chloride of 2-,3- or 4-amino benzoic acid. By means of a dehydro halogenation process with an alkaline agent, the acids of formula (VIII) are then obtained, in which Z represents the 2-cyano vinyl residue. The acids of formula (VIII), in which Z represents the 2-cyano ethyl residue, may be obtained for example by reducing (2-chloro-2-cyano ethyl)-benzoic acids.

The new dyestuffs of formula (I), and more particularly those in which m is equal to zero, Y represents a hydrogen atom, X represents a hydrogen or chlorine atom or a methyl or acetylamino group, R represents an ethyl or β-cyanoethyl group and n is equal to 2, are remarkable disperse dyestuffs which are highly suitable for dyeing and printing fibres and fabrics based on aromatic polyesters or cellulose triacetate. Some of these dyestuffs are also suitable for dyeing cellulose diacetate and polyamides. Before they are used, it is recommended that they be converted into tinctorial prepartions, i.e. that they be pre-dispersed with dispersing agents such as soap, the residual lyes of sulphite cellulose, the products resulting from condensing naphthalene-sulphonic acids with formaldehyde, in particular the dinaphthyl-methane-disulphonate, the sulphonated esters of succinic acid, the products obtained by condensing cresols with formaldehyde and naphtholsulphonic acids.

Polyester fibres may be dyed in the presence of carriers at temperatures ranging from 80° to 125° C. or without a carrier under pressure between 100° and 140° C. They may also be foularded or printed with aqueous dispersions of the new dyestuffs which are then fixed at 140° to 220° C.

The dyestuffs of formula (I) have excellent affinity for these fibres which they dye in shades which are very fast, particularly to sublimation and light.

Compared with the close known dyestuffs of formula (I), in which the residue

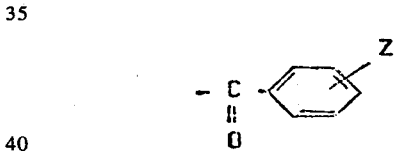

is replaced by an acetyl, benzoyl, p-chlorobenzoyl or cinnamoyl residue, the new dyestuffs of the invention generally have superior fastness to sublimation whilst retaining an excellent tinctorial affinity.

The invention is illustrated by the following Examples, in which the parts indicated are parts by weight unless otherwise mentioned.

EXAMPLE 1

Preparation of 2-(2-chloro-2-cyano ethyl) benzoic acid 274 parts of anthranilic acid are mixed with 650 parts of hydrochloric acid (density 1.15) and 560 parts of crystallizable acetic acid. The mixture is cooled externally to 0° C. by means of a brine, then diazotised by means of 138 parts of sodium nitrite. The solution of the diazo derivative is then poured, whilst being stirred, into a mixture of 190 parts of acetone and 370 parts of acrylonitrile, at the same time as a solution of 6 parts of cuprous chloride in 50 parts of hydrochloric acid (density 1.08). The reaction is exothermic. After the diazonium chloride has disappeared and after decantation and crystallization in water, 330 parts of a product are obtained which has a melting point of 116°–117° C. and which is recrystallized in xylene. 314 parts of 2-(2-chloro-2-cyanoethyl) benzoic acid are obtained. M.P.: 119°–120° C.

| Elementary Analysis: | C % | H % | N % | Cl % |
|---|---|---|---|---|
| Calculated for $C_{10}H_8NO_2Cl$ | 57.28 | 3.82 | 6.68 | 16.95 |
| Found | 57.44 | 3.83 | 6.45 | 16.79 |

By operating in the same manner using 3-amino or 4-amino benzoic acids, the meta (M.P. 112°–113° C.) or para (M.P.: 160°–162° C.) isomers are obtained with yields of 65% and 85% respectively.

EXAMPLE 2

Preparation of 2-(2-chloro-2-cyanoethyl) benzoyl chloride 209.5 parts of 2-(2-chloro-2-cyanoethyl) benzoic acid are made into a paste in 220 parts of toluene and 125 parts of thionyl chloride and the mixture is refluxed until the acid completely dissolves. Then the surplus thionyl chloride and toluene are eliminated under reduced pressure. 2-(2-chloro-2-cyanoethyl) benzoyl chloride is obtained which is liquid at normal temperature.

By operating in the same manner using the meta or paraisomers of 2-(2-chloro-2-cyanoethyl) benzoic acid one obtains 3-(2-chloro-2-cyanoethyl) benzoyl chloride or 4-(2-chloro-2-cyanoethyl) benzoyl chloride respectively.

EXAMPLE 3

Preparation of 4-(2-cyanovinyl) benzoic acid 120 parts of potassium hydroxide are dissolved in 240 parts of methanol and this solution is poured slowly into a mixture of 209.5 parts of 4-(2-chloro-2-cyanoethyl) benzoic acid and 400 parts of methanol. The dehydrohalogenation reaction is very exothermic. Reflux is maintained for 30 minutes. The potassium salt of 4-(2-cyanovinyl) benzoic acid precipitates. It is filtered when cold and taken up in an acid medium to obtain the free acid. Thus, 160 parts of crude 4-(2-cyanovinyl) benzoic acid are obtained which are purified by sublimation under reduced pressure at about 190°–200° C. They are also sublimed under normal pressure at about 270° C.

| Elementary Analysis: | C % | H % | N % |
|---|---|---|---|
| Calculated for $C_{10}H_7NO_2$ | 69.36 | 4.05 | 8.09 |
| Found | 68.04 | 4.15 | 7.88 |

By operating in the same manner the ortho or meta isomers may be obtained.

EXAMPLE 4

Preparation of 4-(2-cyanovinyl) benzoyl chloride 17.3 parts of 4-(2-cyanovinyl) benzoic acid are made into a paste in 80 parts of thionyl chloride and the mixture is refluxed for 15 minutes. Then the surplus thionyl chloride is eliminated under reduced pressure and the 4-(2-cyanovinyl) benzoyl chloride, which is thus obtained, is purified by being recrystallized in xylene. M.P.: 154° C.

| Elementary Analysis: | C % | H % | N % | Cl % |
|---|---|---|---|---|
| Calculated for $C_{10}H_6NCCl$ | 62.75 | 3.14 | 7.32 | 18.55 |
| Found | 63.07 | 3.18 | 7.33 | 18.22 |

The ortho and meta isomers are prepared in the same manner.

EXAMPLE 5

Preparation of 4-(2-cyanoethyl) benzoic acid 100 parts of zinc powder are gradually added to a solution of 209.5 parts of 4-(2-chloro-2-cyanoethyl) benzoic acid in 500 parts of glacial acetic acid. The temperature rises quickly up to reflux and is maintained for approximately 1 hour. The solution is filtered when hot so a to eliminate the insoluble matter, then the filtrate is diluted with 1000 parts of water and the precipitate formed is isolated. Thus 122 parts of 4-(2-cyanoethyl) benzoic acid are obtained. M.P.: 182° C.

| Elementary Analysis: | C % | H % | N % |
|---|---|---|---|
| Calculated for $C_{10}H_9NO_2$ | 68.57 | 5.14 | 8.00 |
| Found | 68.37 | 5.09 | 7.93 |

By operating in the same manner, the 2-(2-cyano ethyl) benzoic acid (ortho isomer) and the 3-(2-cyano ethyl) benzoic acid (meta isomer) may be prepared.

EXAMPLE 6

Preparation of 4-(2-cyanoethyl) benzoyl chloride

A mixture of 17.5 parts of 4-(2-cyanoethyl) benzoic acid and 120 parts of thionyl chloride are refluxed for 15 minutes. The surplus thionyl chloride is then eliminated under reduced pressure and the 4-(2-cyanoethyl) benzoyl chloride is obtained which is liquid at atmospheric temperature.

The ortho and meta isomers may be prepared in the same manner using the corresponding acids.

EXAMPLE 7

179 parts of N-ethyl N-hydroxyethyl metatoluidine are dissolved in 240 parts of acetone and 120 parts of triethylamine. 274 parts of 2-(2-chloro-2-cyanoethyl) benzoyl chloride are introduced gradually. The reaction is exothermic. The mixture is maintained at reflux for approximately 30 minutes. The ester of the formula:

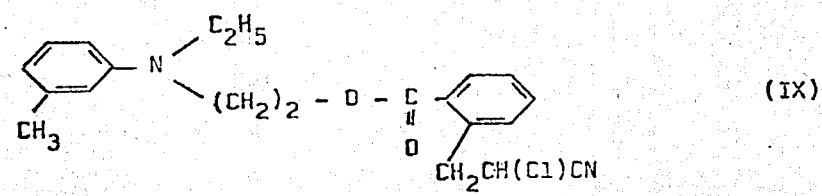

(IX)

which is thus formed may be isolated by decantation in water. The reaction mixture may also be used as such for the subsequent coupling process.

EXAMPLE 8

0.7 parts of sodium nitrite is dissolved in 15 parts of sulphuric acid at 63° Be, then 1.63 parts of 2-amino-5-nitrobenzonitrile are introduced slowly. The solution of the diazo derivative is then poured onto 100 parts of ice and the excess nitrite is destroyed. A solution of 3.70 parts of the ester of formula (IX) in 25 parts of glacial acetic acid is then added gradually. The precipitate is filtered and rinsed until it is neutral.

In the dispersed form, the dyestuff thus obtained of the formula:

has excellent affinity for polyester fibres which it dyes with a shade which is very fast to light and sublimation.

The following Table shows other Examples of dyestuffs according to the invention which have been prepared as in Example 8 by coupling the diazo derivative of the amine of formula (III) indicated in the second column with the ester of formula (IV) defined in the following columns and prepared by the method given in Example 7 using the corresponding alcohol of formula (V) and the corresponding acid chloride of formula (VII). In column Z, the letter $o$, $m$ or $p$ placed in front of the group represented by Z indicated the position (ortho, meta or para respectively) of Z relative to the ester group.

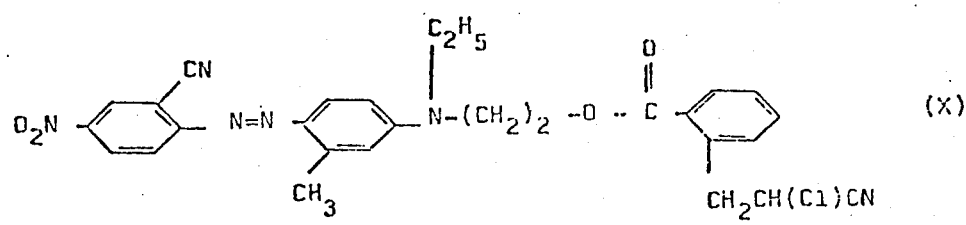

| Example | Amine of formula (III) | n | Y | X | Ester of formula (IV) R | Z | Shade on polyester fibres |
|---|---|---|---|---|---|---|---|
| 9 | 2-amino-5-nitro-benzo-nitrile | 2 | H | CH₃ | C₂H₅ | p, CH₂CH(Cl)CN | ruby |
| 10 | " | " | " | " | " | p, CH=CH—CN | " |
| 11 | " | " | " | " | " | p, CH₂CH₂CN | " |
| 12 | " | " | " | " | " | o, CH₂CH₂CN | " |
| 13 | " | " | " | " | " | m, CH₂CH(Cl)CN | " |
| 14 | " | " | " | NHCOCH₃ | " | o, CH₂CH(Cl)CN | reddish-blue |
| 15 | " | " | " | " | " | p, CH₂CH(Cl)CN | " |
| 16 | " | " | " | " | " | o, CH₂CH₂CN | " |
| 17 | " | " | " | " | " | p, CH₂CH₂CN | " |
| 18 | " | " | " | Cl | " | o, CH₂CH(Cl)CN | red |
| 19 | " | " | " | " | " | p, CH₂CH(Cl)CN | " |
| 20 | " | " | " | " | " | p, CH₂CH₂CN | " |
| 21 | " | " | " | " | " | o, CH₂CH₂CN | " |
| 22 | " | " | OCH₃ | CH₃ | " | o, CH₂CH(Cl)CN | violet |
| 23 | " | " | " | " | " | p, CH₂CH(Cl)CN | " |
| 24 | " | " | " | " | " | p, CH₂CH₂CN | " |
| 25 | " | " | " | " | " | o, CH₂CH₂CN | " |
| 26 | nitrile | " | " | NHCOCH₃ | " | o, CH₂CH(Cl)CN | blue |
| 27 | " | " | " | " | " | o, CH₂CH₂CN | " |
| 28 | " | " | " | " | " | p, CH₂CH(Cl)CN | " |
| 29 | " | " | " | " | " | p, CH₂CH₂CN | " |
| 30 | " | " | H | H | CH₂CH₂CN | o, CH₂CH(Cl)CN | red |
| 31 | " | " | " | " | " | o, CH₂CH₂CN | " |
| 32 | " | " | " | " | " | p, CH₂CH(Cl)CN | " |
| 33 | " | " | " | " | " | p, CH₂CH₂CN | " |
| 34 | " | " | " | benzoyl-amino | C₂H₅ | o, CH₂CH(Cl)CN | reddish-blue |
| 35 | " | " | " | " | " | p, CH₂CH(Cl)CN | " |
| 36 | " | " | " | " | " | p, CH₂CH₂CN | " |
| 37 | " | " | " | " | " | o, CH₂CH₂CN | " |
| 38 | " | " | " | H | C₂H₅ | o, CH₂CH(Cl)CN | bluish-red |
| 39 | " | " | " | " | " | p, CH₂CH(Cl)CN | " |
| 40 | " | " | " | " | " | o, CH₂CH₂CN | " |
| 41 | " | " | " | " | " | p, CH₂CH₂CN | " |
| 42 | " | 3 | " | CH₃ | " | o, CH₂CH(Cl)CN | ruby |
| 43 | " | " | " | " | " | p, CH₂CH₂CN | " |
| 44 | " | 2 | " | H | C₂H₄CO₂C₂H₅ | o, CH₂CH(Cl)CN | bluish-red |
| 45 | " | " | " | " | " | p, CH₂CH₂CN | " |
| 46 | " | " | " | Cl | CH₂CH₂CN | o, CH₂CH(Cl)CN | red |
| 47 | " | " | " | " | CH₂CH₂CN | p, CH₂CH₂CN | " |
| 48 | " | " | " | OCH₃ | " | o, CH₂CH(Cl)CN | bluish-red |
| 49 | " | " | " | " | " | p, CH₂CH₂CN | " |
| 50 | " | " | " | H | 2-[2-(2-chloro-2-cyanoethyl)-benzoyloxy]-ethyl | o, CH₂CH(Cl)CN | red |
| 51 | " | " | " | " | 2-[2-(2-cyanoethyl)-benzoyloxy]-ethyl | o, CH₂CH₂CN | " |
| 52 | " | 3 | " | CH₃ | 2-[4-(2-chloro-2-cyanoethyl)-benzoyloxy]-ethyl | p, CH₂CH(Cl)CN | " |

-continued

| Example | Amine of formula (III) | n | Y | X | R | Z | Shade on polyester fibres |
|---|---|---|---|---|---|---|---|
| 53 | " | " | " | " | 2-[4-(2-cyano-ethyl)4-benzoyloxy]-2-ethyl | p, CH$_2$CH$_2$CN | " |
| 54 | 2-chloro-4-nitro-aniline | " | " | " | C$_2$H$_5$ | o, CH$_2$CH(Cl)CN | scarlet |
| 55 | " | " | " | " | " | p, CH$_2$CH$_2$CN | " |
| 56 | " | 2 | " | " | " | p, CH=CHCN | " |
| 57 | " | " | " | NHCOCH$_3$ | " | o, CH$_2$CH(Cl)CN | bluish-red |
| 58 | " | " | " | " | " | p, CH$_2$CH$_2$CN | " |
| 59 | " | " | " | benzoyl-amino | " | o, CH$_2$CH(Cl)CN | " |
| 60 | " | " | " | " | " | p, CH$_2$CH$_2$CN | " |
| 61 | " | " | OCH$_3$ | NHCOCH$_3$ | " | p, CH$_2$CH$_2$CN | ruby |
| 62 | 2-bromo-4-nitro-aniline | " | H | CH$_3$ | " | o, CH$_2$CH(Cl)CN | scarlet |
| 63 | " | " | " | " | " | p, CH$_2$CH$_2$CN | " |
| 64 | " | " | OCH$_3$ | NHCOCH$_3$ | " | p, CH$_2$CH$_2$CN | ruby |
| 65 | " | " | " | benzoyl-amino | " | o, CH$_2$CH(Cl)CN | " |
| 66 | 2,6-dichloro-4-nitro-aniline | " | H | CH$_3$ | " | o, CH$_2$CH(Cl)CN | reddish brown |
| 67 | " | " | " | " | " | p, CH$_2$CH$_2$CN | " |
| 68 | " | " | " | " | " | p, CH=CHCN | " |
| 69 | " | " | " | NHCOCH$_3$ | " | o, CH$_2$CH(Cl)CN | bordeaux |
| 70 | " | " | " | " | " | p, CH$_2$CH$_2$CN | " |
| 71 | " | " | OCH$_3$ | benzoyl-amino | p, CH$_2$CH$_2$CN | reddish-violet | |
| 72 | " | " | " | " | " | o, CH$_2$CH(Cl)CN | " |
| 73 | 2,6-dibromo-4-nitro-aniline | " | H | CH$_3$ | " | p, CH$_2$CH$_2$CN | reddish-brown |
| 74 | " | " | " | " | " | o, CH$_2$CH(Cl)CN | " |
| 75 | " | " | OCH$_3$ | NHCOCH$_3$ | " | p, CH$_2$CH$_2$CN | reddish-violet |
| 76 | " | " | " | " | " | o, CH$_2$CH(Cl)CN | " |
| 77 | " | " | " | benzoyl-amino | " | p, CH=CHCN | " |
| 78 | " | " | " | " | " | o, CH$_2$CH(Cl)CN | " |
| 79 | " | " | " | " | " | p, CH$_2$CH$_2$CN | " |
| 80 | " | " | " | " | " | o, CH$_2$CH(Cl)CN | " |
| 81 | 4-nitro-aniline | " | H | CH$_3$ | " | o, CH$_2$CH(Cl)CN | scarlet |
| 82 | " | " | " | " | " | p, CH$_2$CH$_2$CN | " |
| 83 | " | " | " | NHCOCH$_3$ | " | o, CH$_2$CH(Cl)CN | red |
| 84 | " | " | " | NHCOCH$_3$ | " | p, CH=CHCN | " |
| 85 | " | " | " | benzoyl-amino | " | p, CH$_2$CH$_2$CN | " |
| 86 | " | " | " | " | " | o, CH$_2$CH(Cl)CN | " |
| 87 | " | " | " | NHCOCH$_3$ | " | p, CH$_2$CH$_2$CN | bluish-red |
| 88 | 2,4-dinitro-6-bromo-aniline | " | H | CH$_3$ | " | p, CH$_2$CH$_2$CN | violet |
| 89 | " | " | " | " | " | p, CH=CHCN | violet |
| 90 | " | " | " | " | " | p, CH$_2$CH(Cl)CN | " |
| 91 | " | " | " | " | " | o, CH$_2$CH(Cl)CN | " |
| 92 | " | " | " | NHCOCH$_3$ | " | p, CH$_2$CH$_2$CN | reddish blue |
| 93 | " | " | " | " | " | o, CH$_2$CH(Cl)CN | " |
| 94 | " | " | " | " | " | o, CH$_2$CH$_2$CN | " |
| 95 | " | " | " | benzoyl-amino | " | p, CH$_2$CH$_2$CN | " |
| 96 | " | " | " | " | " | o, CH$_2$CH$_2$CN | " |
| 97 | " | " | OCH$_3$ | NHCOCH$_3$ | " | p, CH$_2$CH$_2$CN | navy blue |
| 98 | " | " | " | " | " | p, CH=CHCN | " |
| 99 | 2,4-dinitro-6-chloro-aniline | " | H | CH$_3$ | " | o, CH$_2$CH(Cl)CN | bluish-violet |
| 100 | " | " | " | " | " | p, CH$_2$CH$_2$CN | " |
| 101 | " | " | " | NHCOCH$_3$ | " | p, CH$_2$CH$_2$CN | reddish-blue |
| 102 | " | " | " | " | " | m, CH=CHCN | " |
| 103 | " | " | " | benzoyl-amino | " | o, CH$_2$CH$_2$CN | " |
| 104 | " | " | " | " | " | p, CH$_2$CH$_2$CN | " |
| 105 | " | " | OCH$_3$ | NHCOCH$_3$ | " | p, CH$_2$CH$_2$CN | navy blue |
| 106 | 2-amino-3,5-dinitro-benzonitrile | " | H | CH$_3$ | " | p, CH$_2$CH$_2$CN | reddish-blue |
| 107 | " | " | " | " | " | o, CH$_2$CH(Cl)CN | " |
| 108 | " | " | " | NHCOCH$_3$ | " | p, CH$_2$CH$_2$CN | blue |
| 109 | " | " | " | " | " | p, CH$_2$CH(Cl)CN | " |
| 110 | " | " | " | " | " | o, CH$_2$CH(Cl)CN | " |
| 111 | " | " | " | benzoyl-amino | " | p, CH$_2$CH$_2$CN | " |
| 112 | " | " | OCH$_3$ | " | " | p, CH$_2$CH$_2$CN | greenish-blue |
| 113 | " | " | " | " | " | p, CH=CHCN | " |
| 114 | 4-amino-azobenzene | " | H | CH$_3$ | " | p, CH$_2$CH$_2$CN | orange |
| 115 | " | " | " | " | " | o, CH$_2$CH(Cl)CN | " |
| 116 | " | " | " | NHCOCH$_3$ | " | p, CH=CHCN | scarlet |
| 117 | " | " | " | " | " | p, CH$_2$CH$_2$CN | " |

-continued

| Example | Amine of formula (III) | Ester of formula (IV) | | | | | Shade on polyester fibres |
|---|---|---|---|---|---|---|---|
| | | n | Y | X | R | Z | |
| 118 | " | " | " | benzoyl-amino | " | m, CH₂CH₂CN | " |
| 119 | " | " | " | " | " | o, CH₂CH(Cl)CN | " |
| 120 | 2-amino-5-nitro-thiazole | " | " | CH₃ | " | o, CH₂CH(Cl)CN | reddish-blue |
| 121 | " | " | " | " | " | p, CH₂CH(Cl)CN | " |
| 122 | " | " | " | " | " | p, CH₂CH₂CN | " |
| 123 | " | " | " | " | " | p, CH=CHCN | " |
| 124 | " | " | " | " | " | o, CH₂CH₂CN | " |
| 125 | " | " | " | NHCOCH₃ | " | p, CH₂CH₂CN | blue |
| 126 | " | " | " | " | " | o, CH₂CH(Cl)CN | " |
| 127 | " | " | " | benzoyl-amino | " | p, CH₂CH₂CN | " |
| 128 | " | " | " | " | " | m, CH₂CH(Cl)CNZ | " |
| 129 | " | " | OCH₃ | NHCOCH₃ | " | p, CH₂CH₂CN | greenish-blue |
| 130 | 3-methyl-4-nitro-5-amino-isothiazole | " | H | CH₃ | " | o, CH₂CH(Cl)CN | ruby |
| 131 | " | " | " | " | " | p, CH₂CH₂CN | " |
| 132 | 2-amino-6-carbethoxy-benzothiazole | " | " | " | " | o, CH₂CH(Cl)CN | red |
| 133 | " | " | " | NHCOCH₃ | " | p, CH₂CH₂CN | ruby |
| 134 | " | " | " | benzoyl-amino | " | p, CH₂CH₂CN | " |
| 135 | 2-amino-6-thiocyano-benzothiazole | " | " | CH₃ | " | CH₂CH(Cl)CN | bluish-red |
| 136 | " | " | " | NHCOCH₃ | " | p, CH₂CH₂CN | reddish-violet |
| 137 | " | " | " | benzoyl-amino | " | m, CH=CHCN | " |
| 138 | 2-amino-6-methylsulfonyl-benzothiazole | " | " | CH₃ | " | p, CH₂CH₂CN | ruby |
| 139 | " | " | " | NHCOCH₃ | " | p, CH₂CH₂CN | violet |
| 140 | " | " | " | benzoyl-amino | " | o, CH₂CH(Cl)CN | " |
| 141 | 2-amino-6-cyano-benzothiazole | " | " | CH₃ | " | o, CH₂CH(Cl)CN | red |
| 142 | " | " | " | NHCOCH₃ | " | p, CH₂CH₂CN | ruby |
| 143 | " | " | " | benzoyla-mino | " | p, CH₂CH₂CN | " |
| 144 | 2-amino-6-nitro-benzo-thiazole | " | " | CH₃ | " | o, CH₂CH(Cl)CN | bluish-red |
| 145 | " | " | " | NHCOCH₃ | " | p, CH₂CH₂CN | violet |
| 146 | " | " | " | benzoyl-amino | " | o, CH₂CH(Cl)CN | " |
| 147 | 2-methylsulfonyl-4-nitro-aniline | " | " | CH₃ | " | m, CH₂CH(Cl)CN | ruby |
| 148 | " | " | " | NHCOCH₃ | " | p, CH₂CH₂CN | violet |
| 149 | " | " | " | benzoyl-amino | " | p, CH₂CH₂CN | " |
| 150 | 2-chloro-4-methyl-sulfonyl-aniline | " | " | NHCOCH₃ | " | p, CH₂CH(Cl)CN | red |
| 151 | 2-nitro-4-methyl-sulfonyl-aniline | " | " | CH₃ | " | o, CH₂CH(Cl)CN | " |
| 152 | " | " | " | NHCOCH₃ | " | p, CH₂CH₂CN | ruby |
| 153 | 3-amino-5-nitro-benzisothiazole-2,1 | " | " | CH₃ | " | o, CH₂CH(Cl)CN | blue |
| 154 | " | " | " | NHCOCH₃ | " | p, CH₂CH₂CN | greenish-blue |
| 155 | " | " | " | benzoyl-amino | " | p, CH₂CH₂CN | " |
| 156 | 2-amino-5-nitro-thiadiazole-1,3,4 | " | " | CH₃ | " | o, CH₂CH(Cl)CN | scarlet |
| 157 | " | " | " | NHCOCH₃ | " | p, CH₂CH₂CN | red |
| 158 | 3-methylsulfonyl-5-amino thiadiazole-1,2,4 | " | " | CH₃ | " | o, CH₂CH(Cl)CN | " |
| 159 | " | " | " | NHCOCH₃ | " | p, CH₂CH₂CN | bluish-red |
| 160 | 3-phenyl-5-amino-thiadiazole-1,2,4 | " | " | CH₃ | " | p, CH₂CH₂CN | red |
| 161 | " | " | " | NHCOCH₃ | " | o, CH₂CH(Cl)CN | bluish-red |
| 162 | 2-amino-3-chloro-5-nitro benzonitrile | " | " | CH₃ | " | o, CH₂CH(Cl)CN | violet |
| 163 | " | " | " | NHCOCH₃ | " | p, CH₂CH₂CN | bluish-violet |
| 164 | 2-amino-3-bromo-5-nitro benzonitrile | " | " | CH₃ | " | p, CH=CHCN | violet |
| 165 | " | " | " | NHCOCH₃ | " | p, CH₂CH₂CN | bluish-violet |
| 166 | 2-carbethoxy-4-nitro-aniline | " | " | " | " | p, CH₂CH₂CN | ruby |
| 167 | " | " | " | CH₃ | " | p, CH₂CH₂CN | red |
| 168 | 2-amino-5-nitro-benzo-nitrile | " | " | H | C₂H₄OCO-CH₃ | o, CH₂CH₂CN | ruby |

-continued

| Example | Amine of formula (III) | n | Y | X | Ester of formula (IV) R | Z | Shade on polyester fibres |
|---|---|---|---|---|---|---|---|
| 169 | " | " | " | " | " | p, $CH_2CH_2CN$ | " |
| 170 | " | " | " | " | $C_2H_4CO_2CH_3$ | o, $CH_2CH_2CN$ | " |
| 171 | " | " | " | " | " | p, $CH_2CH_2CN$ | " |
| 172 | " | " | " | " | $C_2H_4OH$ | o, $CH_2CH_2CN$ | " |
| 173 | " | " | " | " | " | p, $CH_2CH_2CN$ | " |
| 174 | " | " | " | " | $C_2H_4OCH_3$ | p, $CH_2CH_2CN$ | " |
| 175 | " | " | " | " | $C_2H_4SO_2$-$CH_3$ | o, $CH_2CH_2CN$ | red |
| 176 | " | " | " | " | $C_2H_4OCO_2$-$CH_3$ | o, $CH_2CH_2CN$ | ruby |
| 177 | " | " | " | " | phenoxy-ethyl | p, $CH_2CH_2CN$ | " |
| 178 | 2-amino-3-nitro-5-acetyl-thiophene | " | " | $CH_3$ | $C_2H_5$ | o, $CH_2CH_2CN$ | blue |
| 179 | " | " | " | " | " | p, $CH_2CH_2CN$ | " |
| 180 | 2-amino-5-nitro-benzonitrile | " | $OC_2H_5$ | " | " | o, $CH_2CH_2CN$ | violet |
| 181 | " | " | $CH_3$ | " | " | o, $CH_2CH_2CN$ | ruby |
| 182 | " | " | $C_2H_5$ | H | " | " | " |
| 183 | " | " | H | $C_2H_5$ | " | " | " |
| 184 | " | " | " | $OC_2H_5$ | $CH_2CH_2CN$ | " | bluish-red |
| 185 | " | " | " | NH—CHO | $C_2H_5$ | " | reddish-blue |
| 186 | " | " | " | $NHCOC_2H_5$ | " | " | " |
| 187 | " | " | " | cinnamoyl-amino | " | " | " |
| 188 | 3-chloro-4-amino-azobenzene | " | " | $CH_3$ | " | " | scarlet |
| 189 | 3-bromo-amino-azobenzene | " | " | " | " | " | " |
| 190 | 3,5-dichloro-4-amino-azobenzene | " | " | " | " | " | reddish-brown |
| 191 | 3,5-dibromo-4-amino-azobenzene | " | " | " | " | " | " |
| 192 | 4-amino-2-methyl-azobenzene | " | " | " | " | " | orange |
| 193 | 4-amino-2-ethyl-azobenzene | " | " | " | " | " | " |
| 194 | 4-amino-2-methoxy-azobenzene | " | " | " | " | " | reddish-orange |
| 195 | 4-amino-2-ethoxy-azobenzene | " | " | " | " | " | " |
| 196 | 2,4-dinitro-6-chloro-aniline | " | " | " | " | " | bluish-violet |
| 197 | 2,6-dichloro-4-nitro-aniline | " | " | " | " | " | reddish- |

EXAMPLE 198

5.5 parts of 2-cyano-4-nitro 2'-methyl-4'-[N-ethyl-N-(hydroxy-ethyl)amino] azobenzene, obtained by coupling the diazo derivative of 2-amino-5-nitrobenzonitrile with N-ethyl-N-hydroxyethyl metatoluidine, are dissolved in 50 parts of pyridine. 2.5 parts of 2-(2-chloro-2-cyanoethyl) benzoyl chloride are added slowly, then the mixture is heated at 40°–50° C. for 30 minutes. The dyestuff is salted out by simply diluting the mixture with 250 parts of water, acidifying the mixture by means of hydrochloric acid up to pH 3-4 and by the temperature being maintained at 10° C. to 15° C. The dyestuff thus obtained is identical with that in Example 8.

EXAMPLE 199

A fabric of ethylene glycol polyterephthalate fibres is printed with a printing paste containing 20 parts of the dyestuff of Example 11, 150 parts of a solid salt of sulphonated castor oil, 600 parts of a thickening agent and 250 parts of water. After being dried, the fabric is thermofixed for one minute at 200° C. and then subjected to a reducing treatment with sodium dithionate. A ruby shade having very good general fastness is obtained.

EXAMPLE 200

A fabric of ethylene glycol polyterephthalate fibres is foularded in a bath comprising 9 parts of the dyestuff of Example 100, 0.5 parts of a polyglycol ether of oleic alcohol, 1.5 parts of a polyacrylamide and 989 parts of water. After it has been dried, the fabric is thermofixed for one minute at 200° C. and then subjected to a reducing treatment with sodium dithionate. A violet shade is obtained with very good general fastness.

We claim:
1. Dyestuff of the formula:

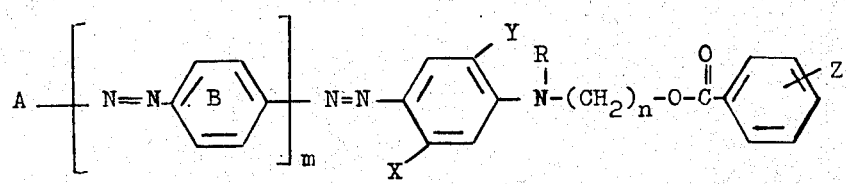

in which m is equal to 0 or 1, n is equal to 1, 2 or 3, A represents the residue of an aromatic diazotisable amine devoid of solubilising acid groups, the benzene ring B is unsubstituted or substituted by one or two atoms of chlorine or bromine or methyl, ethyl, methoxy, ethoxy, or acylamino groups, X represents a hy-

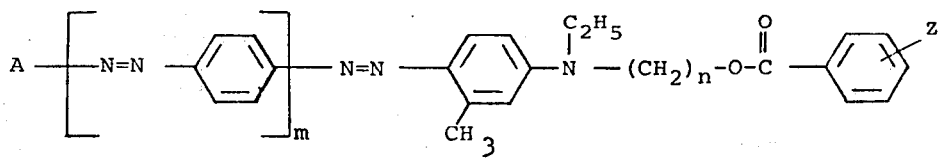

drogen or chlorine atom or a methyl, ethyl, methoxy, ethoxy or acylamino group, Y represents a hydrogen atom or a methyl, ethyl, methoxy or ethoxy group, R is alkyl containing 1 to 4 carbon atoms, and Z represents a 2-cyanovinyl, 2-cyanoethyl or 2-chloro-2-cyanoethyl residue.

2. Dyestuff as claimed in claim 1 wherein n is equal to 2.

3. Dyestuff as claimed in claim 1 wherein A is substituted by alkylsulphonyl groups in which the alkyl residue contains 1 to 4 carbon atoms.

4. Dyestuff as claimed in claim 1 wherein A is substituted by carbalkoxy groups in which the alkyl residue contains 1 to 4 carbon atoms.

5. Dyestuff as claimed in claim 1 wherein m is zero, Y is hydrogen, X is hydrogen, chlorine, methyl or acetylamino, R is ethyl or β-cyanoethyl and n is 2.

6. A dyestuff of the formula in which A, m, n and Z are as defined in claim 1.

7. Process for colouring hydrophobic materials in which the colouring agent is a dyestuff as claimed in claim 1.

8. Hydrophobic materials which have been dyed or printed by a dyestuff as claimed in claim 1.

9. Fibres or fabrics based on aromatic polyesters or cellulose triacetate dyed or printed with a dyestuff as claimed in claim 1.

10. The dyestuff of the formula:

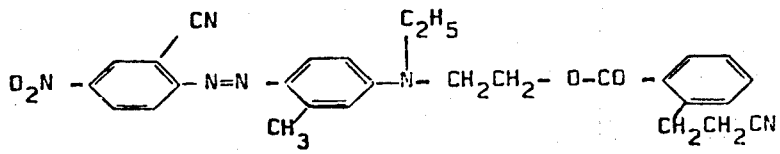

11. The dyestuff of the formula:

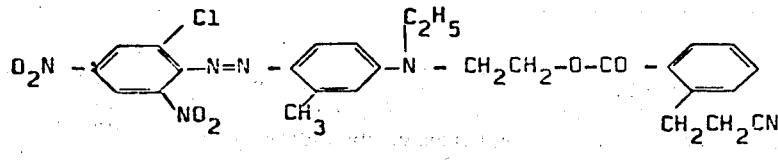

12. The dyestuff of the formula:

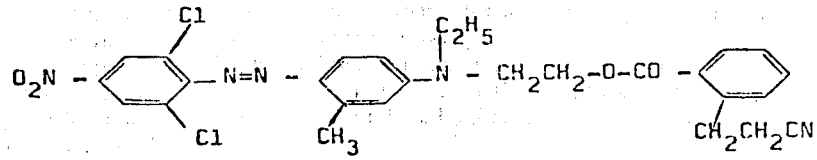

* * * * *

UNITED STATES PATENT OFFICE
CERTIFICATE OF CORRECTION

PATENT NO. : 3,987,027
DATED : October 19, 1976
INVENTOR(S) : BROUARD ET AL

It is certified that error appears in the above-identified patent and that said Letters Patent are hereby corrected as shown below:

The names of the inventors should be corrected as follows:

CLAUDE MARIE HENRI BROUARD should be "CLAUDE MAIRE HENRI EMILE BROUARD".

LOUIS JEAN-PIERRE LEROY should be "JEAN-MARIE LOUIS LEROY".

Signed and Sealed this

Twenty-second Day of February 1977

[SEAL]

Attest:

RUTH C. MASON
Attesting Officer

C. MARSHALL DANN
Commissioner of Patents and Trademarks